(12) United States Patent
Lawther

(10) Patent No.: US 6,311,018 B1
(45) Date of Patent: Oct. 30, 2001

(54) METHOD OF MAKING RESPECTIVE PRINTS OF RECORDED IMAGES WITHIN SUCCESSIVE FILM FRAMES OR ALTERNATIVELY OF SELECTED PORTIONS OF THE IMAGES

(75) Inventor: Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/644,439

(22) Filed: Aug. 23, 2000

(51) Int. Cl.[7] .............................. G03B 17/00; G03B 17/24
(52) U.S. Cl. .............................. 396/60; 396/210; 396/311
(58) Field of Search .............................. 396/60, 210, 311, 396/319, 315

(56) References Cited

U.S. PATENT DOCUMENTS

| | | |
|---|---|---|
| 4,650,304 | 3/1987 | Harvey . |
| 4,924,248 | 5/1990 | Taniguchi et al. . |
| 4,928,124 | 5/1990 | Taniguchi et al. . |
| 5,151,726 | 9/1992 | Iwashita et al. . |
| 5,311,228 * | 5/1994 | Stoneham et al. .................... 396/315 |
| 5,471,265 * | 11/1995 | Shibata et al. ........................ 396/60 |
| 5,761,558 | 6/1998 | Patton et al. . |
| 5,767,945 | 6/1998 | Fields et al. . |
| 5,978,067 | 11/1999 | Saito et al. . |

* cited by examiner

Primary Examiner—Russell Adams
Assistant Examiner—Arthur A Smith
(74) Attorney, Agent, or Firm—Roger A. Fields

(57) ABSTRACT

A method of making respective prints of recorded images within successive film frames of a filmstrip or alternatively of selected portions of the images includes the steps of:
  determining whether a particular indication is present on the filmstrip which serves as a unique indication to look for a pseudo format indication within each film frame that a selected portion of a recorded image within the film frame is to be printed
  printing the recorded image within each film frame when the particular indication is determined not to be present on the filmstrip;
  determining whether the pseudo format indication is present within each film frame when the particular indication is determined to be present on the filmstrip;
  printing the selected portion of the recorded image within a film frame when the pseudo format indication is determined to be present within the film frame, or printing the recorded image within the film frame when the particular indication is determined to be present on the filmstrip, but the pseudo format indication is determined not to be present within the film frame.

3 Claims, 3 Drawing Sheets

METHOD OF MAKING RESPECTIVE PRINTS OF RECORDED IMAGES WITHIN SUCCESSIVE FILM FRAMES OR ALTERNATIVELY OF SELECTED PORTIONS OF THE IMAGES

FIELD OF THE INVENTION

The invention relates generally to the field of photography, and in particular to a print making method. More specifically, the invention relates to a method of making respective prints of recorded images within successive film frames or alternatively of selected portions of the images.

BACKGROUND OF THE INVENTION

The "Advanced Photographic System"

Reloadable and one-time-use cameras for the new worldwide "Advanced Photo System" can give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. Each format has a different aspect ratio.

The camera records the choice of "C", "H" or "P" format magnetically and/or optically on one longitudinal edge of the filmstrip for each exposed frame on the filmstrip. The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits.

To make the prints, the photofinisher's printer system reads the optical or magnetic encodements on film and automatically prints each print in accordance with the selected "C", "H" or "P" format. A print having a "C" format is typically 4×6 inches. A print having a "H" format is typically 4×7 inches. And a print having a "P" format is typically 4×10 inches or 4×11.5 inches. No matter which format is selected in the camera, "C", "H" or "P", the exposed frame on the filmstrip are always in the "H" format. This allows re-prints to be made in any of the three formats rather than just in the selected format.

The photographer will know substantially how much of a subject being photographed will be included in a print having the "C", "H" or "P" format, because the viewfinder in the camera typically includes a variable format mask, such as a mechanical masking blade or an electronic masking liquid crystal display, for framing the subject as seen in the viewfinder. The mask is adjustable to frame the subject in accordance with the "C", "H" or "P" format. A manually operated format selector is provided to change the format of the mask to view the "C", "H" or "P" format in the viewfinder. When a shutter release button is manually depressed to take a picture, the choice of format is magnetically and/or optically recorded on one longitudinal edge of the filmstrip adjacent the exposed frame.

Earlier Prior Art

U.S. Pat. No. 4928124 issued May 22, 1990 discloses a camera having a manually operated selector for selecting that an exposed frame on a 35 mm filmstrip be printed according to a pseudo telephoto format which is optically encoded within the exposed frame at an edge-region that is not to be included in the print. The encodement tells the printer to make the print from a central portion of the exposed frame, rather than from substantially the entire frame. Thus, the print of the central portion is the same as when a telephoto focal length was selected to make the exposure.

U.S. Pat. No. 4650304 issued Mar. 17, 1987 discloses a camera adapted to receive a conventional film cartridge to take exposures to only make normal prints and alternatively to receive a special film cartridge to take exposures to make pseudo telephoto format and/or normal prints. The encodement for the pseudo telephoto format is optically encoded adjacent the exposed frame.

SUMMARY OF THE INVENTION

According to the invention, a method of making respective prints of recorded images within successive film frames of a filmstrip or alternatively of selected portions of the images comprises the steps of:

determining whether a particular indication is present on the filmstrip which serves as a unique indication to look for a pseudo format indication within each film frame that a selected portion of a recorded image within the film frame is to be printed printing the recorded image within each film frame when the particular indication is determined not to be present on the filmstrip;

determining whether the pseudo format indication is present within each film frame when the particular indication is determined to be present on the filmstrip;

printing the selected portion of the recorded image within a film frame when the pseudo format indication is determined to be present within the film frame, or printing the recorded image within the film frame when the particular indication is determined to be present on the filmstrip, but the pseudo format indication is determined not to be present within the film frame.

More specifically, there is provided a method of making respective prints of recorded images within successive film frames or alternatively of selected portions of the images comprising the steps of:

determining whether a multi-format indication which indicates that any one of several possible-selected portions of a recorded image within a film frame is to be printed, is present adjacent the film frame;

printing the recorded image within the film frame when the multi-format indication is determined not to be present adjacent the film frame;

determining whether at least a first pseudo format indication which indicates that a particular one of the possible-selected portions of the recorded image is to be printed, or a second pseudo format indication which indicates that another one of the possible-selected portions of the recorded image is to be printed, is present within the film frame, when the multi-format indication is determined to be present adjacent the film frame;

printing the particular one of the possible-selected portions of the recorded image within the film frame when the first pseudo format indication is determined to be present within the film frame, or printing the other one of the possible-selected portions of the recorded image within the film frame when the second pseudo format indication is determined to be present within the film frame; and printing the recorded image within the film frame when the multi-format indication is determined to be present adjacent the film frame, but at least the first and second pseudo format indications are determined not to be present within the film frame.

DETAILED DESCRIPTION OF THE INVENTION

The invention is disclosed as being embodied preferably in a digital printer. Because the features of a digital printer are generally known, the description which follows is directed in particular only to those elements forming part of or cooperating directly with the disclosed embodiment. It is to be understood, however, that other elements may take various forms known to a person of ordinary skill in the art.

Figure 1:
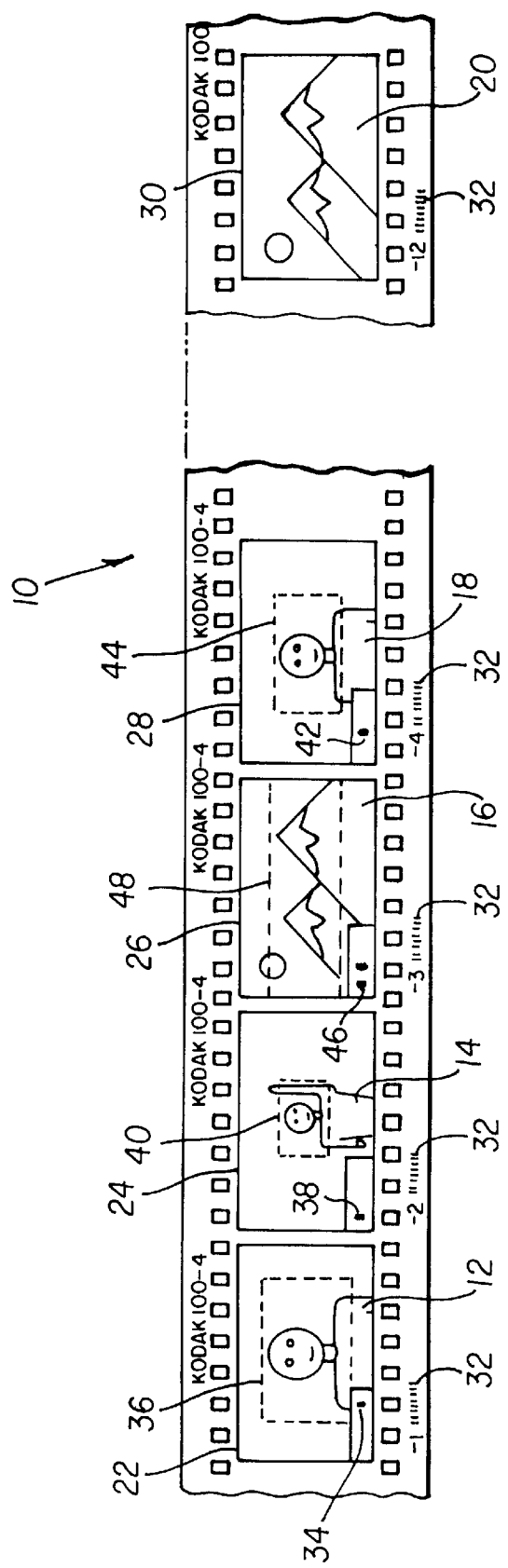
FIG. 1 is an illustration of a processed 35 mm filmstrip that is subjected to a method of making respective prints of recorded images within successive film frames or alternatively of selected portions of the images, consistent with a preferred embodiment of the invention.

Referring now to the drawings, FIG. 1 shows a processed (negative) 35 mm filmstrip 10 having various full-frame recorded images, such as the recorded images 12, 14, 16, 18 and 20, within successive film frames, such as the film frames 22, 24, 26, 28 and 30. A multi-format indication 32 which indicates that any one of several possible-selected portions of the recorded image 12, 14, 16, 18 or 20 within the film frame 22, 24, 26, 28 or 30 is to be printed, is present adjacent each one of the film frames. The multi-format indication 32 is in the form of a "DX"-type bar code that is provided on the filmstrip 10 during film manufacture, although any known encodement will suffice. A 1.5× pseudo telephoto format indication 34 which indicates that a particular rectangular portion 36 of the recorded image 12 is to be printed, is recorded within the film frame 22 when the recorded image is made in a camera (not shown). A 3× pseudo telephoto format indication 38 which indicates that a particular rectangular portion 40 of the recorded image 14 is to be printed, is recorded within the film frame 24 when the recorded image is made in the camera. A 2× pseudo telephoto format indication 42 which indicates that a particular rectangular portion 44 of the recorded image 18 is to be printed, is recorded within the film frame 28 when the recorded image is made in the camera. A pseudo panoramic format indication 46 which indicates that a particular rectangular portion 48 of the recorded image 16 is to be printed, is recorded within the film frame 26 when the recorded image is made in the camera. No pseudo format indication is recorded within the film frame 30 which indicates that the recorded image 20 is to be printed substantially in its entirety. The 1.5× pseudo telephoto format indication 34 recorded in the camera within the film frame 22 is the binary 001. The 3× pseudo telephoto format indication 38 recorded in the camera within the film frame 24 is the binary 100. The 2× pseudo telephoto format indication 42 recorded in the camera within the film frame 28 is the binary 010. The pseudo panoramic format indication 46 recorded in the camera within the film frame 26 is the binary 110. No pseudo format indication recorded within the film frame 30 is the binary 000. Preferably, the 1.5×, 2× and 3× pseudo telephoto indications 34, 42, 38 and the pseudo panoramic indication 46 are recorded in the camera on a masked rectangular bottom-corner region of the film frames.

The rectangular portions 36, 40 and 44 of the recorded images 12, 14 and 18 within the film frames 22, 24 and 28 have the same aspect ratio, but the aspect ratio is different than the aspect ratio of the rectangular portion 48 of the recorded image 16 within the film frame 26. Prints made of the respective portions 36, 40 and 44 of the recorded images 12, 14 and 18 are the same size. A print made from rectangular portion 48 of the recorded image 16 has a different, wider or panoramic size.

Figure 2:
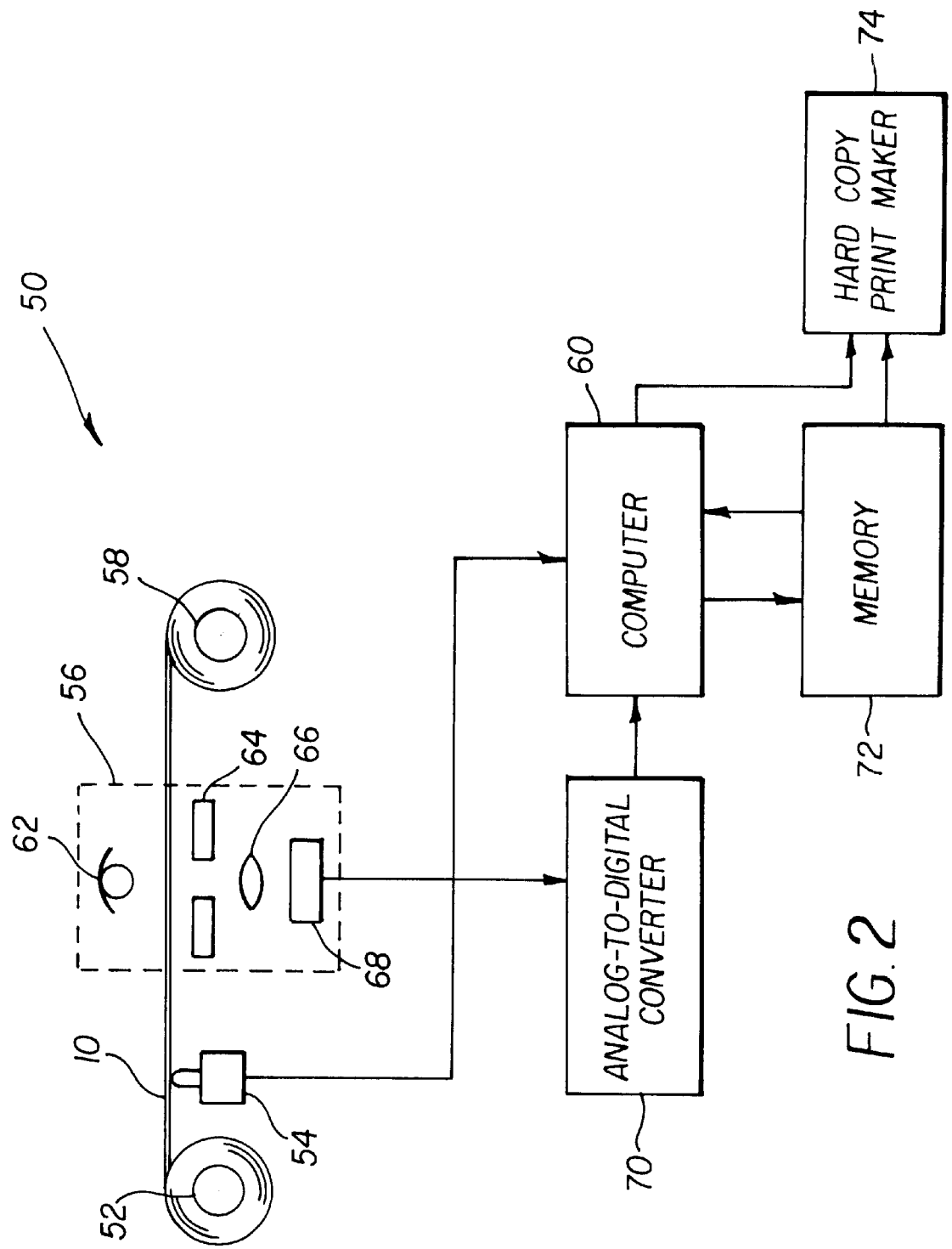
FIG. 2 is a printer system for implementing the method.

FIG. 2 schematically depicts a printer system 50 used to make respective prints of recorded images within successive film frames of a processed filmstrip with and without the multi-format indication 32. That is, the printer system 50 can make prints of recorded images within successive film frames of a conventional 35 mm filmstrip (not shown), and it can make prints of recorded images or alternatively selected portions of the images in the illustrated filmstrip 10. The printer system 50 is fashioned from a digital printer disclosed in U.S. Pat. No. 5767945 issued Jun. 16, 1998, or it can be fashioned from an analog printer shown in U.S. Pat. No. 5978067 issued Nov. 2, 1999. Both of the patents are incorporated by reference in this application.

The printer system 50 includes a known motorized film drive (not shown) for advancing a filmstrip such as a conventional 35 mm filmstrip or the illustrated filmstrip 10 from film supply reel 52, past a known digital bar code reader 54, through a known digital scanner 56 and onto a film take-up reel 58. The digital bar code reader 54 reads the multi-format indication 32 adjacent each film frame 22, 24, 26, 28 and 30 on the filmstrip 10 and inputs it in digital form for each film frame into a known computer 60. The digital film scanner 56 has a projection light source 62 that shines bright light through each film frame when the film frame is momentarily positioned at a frame gate 64, and a focusing lens 66 that focuses a light-projected image of the recorded image and the 1.5× or 2× or 3× pseudo telephoto format indication 34, 42, 38 or the pseudo panoramic format indication 46, within the film frame, on a scanning image sensor 68 such as a coupled device (CCD). The resultant analog electronic image/pseudo format indication signals provided by the image sensor 68 are applied to a known analogto digital converter 70 that converts the analog electrical image/pseudo format indication signals into digital form which is then inputted to the computer 60. A known memory 72 connected to the computer 60 includes permanent look-up tables for the digital forms of the multi-format designation 32, the 1.5×, 2× and 3× pseudo telephoto format indications 34, 42, 38 and the pseudo panoramic format indication 46. This enables the computer 60 to determine their individual presence on the filmstrip 10. A known hard copy print maker 74 is connected to the computer 60 to make a hard copy print of each recorded image or alternatively of a selected portion of the image.

Figure 3:
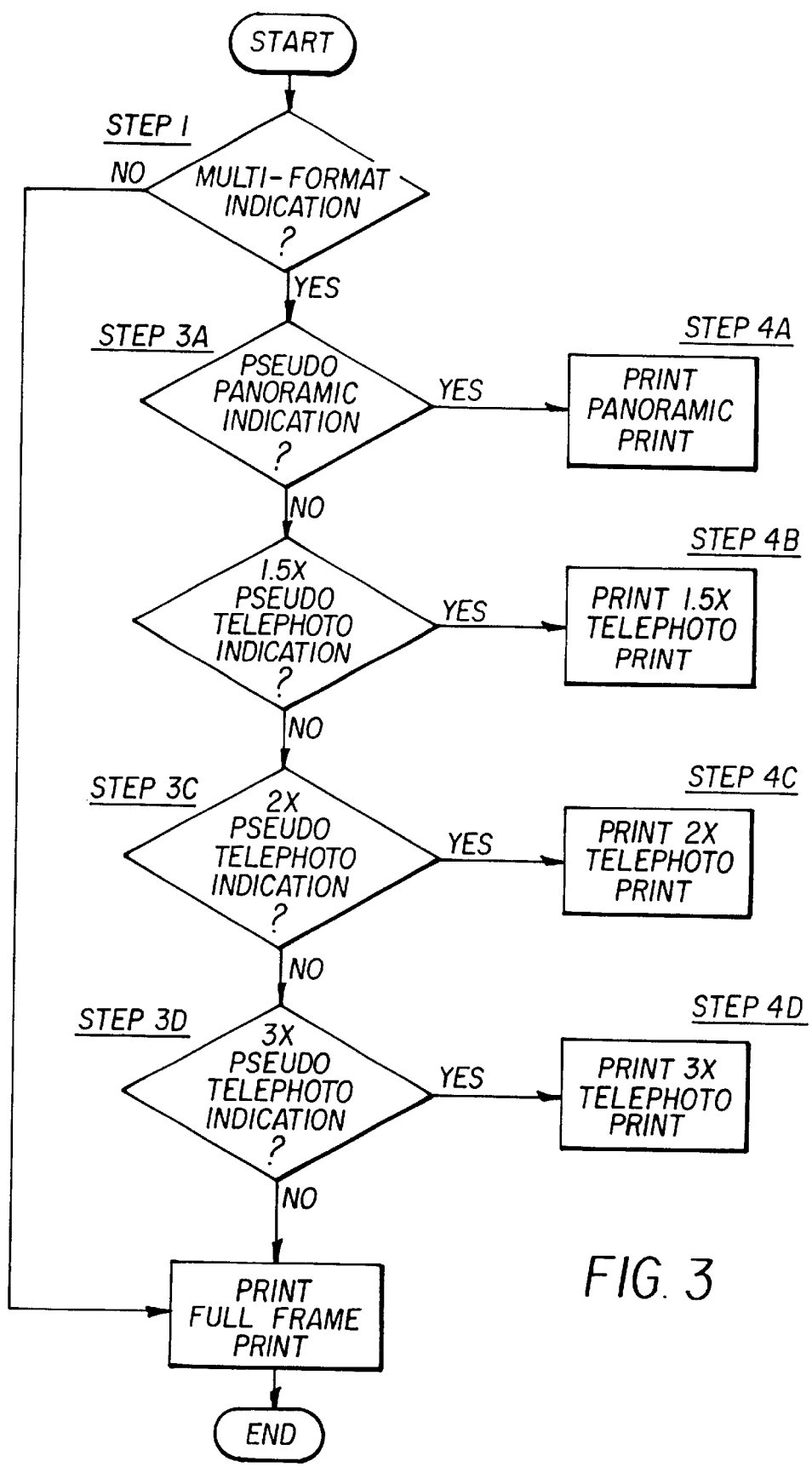
FIG. 3 is a flow chart depicting the method.

A method of making prints of recorded images within successive film frames of a conventional 35 mm filmstrip (not shown), and making prints of recorded images or alternatively of selected portions of the images in the illustrated filmstrip 10, using the printer system 50, is shown in FIG. 3. The method as shown in FIG. 3 is for each film frame, and comprises the following steps.

STEP 1: Determining via the bar code reader 54 and the computer 60 whether the multi-format indication 32 which indicates that any one of the possible-selected portions 36, 40, 44 or 48 of a recorded image within the film frame next-to-be-advanced to the frame gate 64 is to be printed, is present adjacent the film frame.

STEP 2: Printing via the computer 60 and the hard copy print maker 74 a hard copy of the recorded image within the film frame at the frame gate 64, when the multi-format indication 32 is determined not to be present adjacent the film frame.

STEPS 3A–D: Determining via the computer 60 and the memory 72 whether the pseudo panoramic indication 46 (STEP 3A), the 1.5× pseudo telephoto format indication 34 (STEP 3B), the 2× pseudo telephoto format indication 42 (STEP 3C), the 3× pseudo telephoto format indication 38 (STEP 3D), or no pseudo format indication (STEP 3D), is present within the film frame at the frame gate 64, when the multi-format indication 32 is determined to be present adjacent the film frame.

STEPS 4A–D: Printing via the computer 60 and the hard copy print maker 74 a hard copy of the respective portions 48 (STEP 4A), 36 (STEP 4B), 40 (STEP 4C) or 44 (STEP 4D) of the recorded image within the film frame at the frame gate 64, when the pseudo panoramic indication 46, the 1.5× pseudo telephoto format indication 34, the 2× pseudo telephoto format indication 42, or the 3× pseudo telephoto format indication 38 is present within the film frame.

STEP 2: Printing via the computer 60 and the hard copy print maker 74 a hard copy of the recorded image within the film frame at the frame gate 64 when the multi-format indication 32 is determined to be present adjacent the film frame, but the pseudo panoramic indication 46, the 1.5× pseudo telephoto format indication 34, the 2× pseudo telephoto format indication 42, and the 3× pseudo telephoto format indication 38 are not present within the film frame.

The invention has been described with reference to a preferred embodiment. However, it will be appreciated that variations and modifications can be effected by a person of ordinary skill in the art without departing from the scope of the invention.

PARTS LIST 10. processed 35 mm filmstrip
12. recorded image
14. recorded image
16. recorded image
18. recorded image
20. recorded image
22. film frame
24. film frame
26. film frame
28. film frame
30. film frame
32. multi-format indication
34. 1.5× pseudo telephoto indication
36. rectangular portion
38. 3× pseudo telephoto indication
40. rectangular portion
42. 2× pseudo telephoto indication
44. rectangular portion
46. pseudo panoramic indication
48. rectangular portion
50. printer system
52. film supply reel
54. digital bar code reader
56. digital scanner
58. film take-up reel
60. computer
62. light source
64. frame gate
66. focusing lens
68. scanning image sensor
70. analog-to-digital converter
72. memory
74. hard copy print maker

What is claimed is:

1. A method of making respective prints of recorded images within successive film frames of a filmstrip or alternatively of selected portions of the images, said method comprising the steps of:

determining whether a particular indication is present on the filmstrip which serves as a unique indication to look for a pseudo format indication within each film frame that a selected portion of a recorded image within the film frame is to be printed printing the recorded image within each film frame when the particular indication is determined not to be present on the filmstrip;

determining whether the pseudo format indication is present within each film frame when the particular indication is determined to be present on the filmstrip;

printing the selected portion of the recorded image within a film frame when the pseudo format indication is determined to be present within the film frame, or printing the recorded image within the film frame when the particular indication is determined to be present on the filmstrip, but the pseudo format indication is determined not to be present within the film frame.

2. A method of making respective prints of recorded images within successive film frames or alternatively of selected portions of the images, said method comprising the steps of:

determining whether a multi-format indication which indicates that any one of several possible-selected portions of a recorded image within a film frame is to be printed, is present adjacent the film frame;

printing the recorded image within the film frame when the multi-format indication is determined not to be present adjacent the film frame;

determining whether at least a first pseudo format indication which indicates that a particular one of the possible-selected portions of the recorded image is to be printed, or a second pseudo format indication which indicates that another one of the possible-selected portions of the recorded image is to be printed, is present within the film frame, when the multi-format indication is determined to be present adjacent the film frame;

printing the particular one of the possible-selected portions of the recorded image within the film frame when the first pseudo format indication is determined to be present within the film frame, or printing the other one of the possible-selected portions of the recorded image within the film frame when the second pseudo format indication is determined to be present within the film frame; and printing the recorded image within the film frame when the multi-format indication is determined to be present adjacent the film frame, but at least the first and second pseudo format indications are determined not to be present within the film frame.

3. A printer system for making respective prints of recorded images within successive film frames or alternatively of selected portions of the images, said printer comprising:

a reader that determines whether a multi-format indication which indicates that any one of several possible-selected portions of a recorded image within a film frame is to be printed, is present adjacent the film frame;

a computer connected to said reader that determines whether at least a first pseudo format indication which indicates that a particular one of the possible-selected portions of the recorded image is to be printed, or a second pseudo indication which indicates that another one of the possible-selected portions of the recorded image is to be printed, is present within the film frame, when the multi-format indication is determined to be present adjacent the film frame; and a hard copy print maker connected to said computer that makes a print of the recorded image within the film frame when the multi-format indication is determined not to be present adjacent the film frame or the multi-format indication is determined to be present adjacent the film frame, but at least the first and second pseudo format indications are determined not to be present within the film frame, and makes a print of the particular one of the possible-selected portions of the recorded image within the film frame when the first or second pseudo format indication is determined to be present within the film frame.

* * * * *